May 26, 1970 E. O. GILBERT 3,514,635

ANALOG COMPUTER FEEDBACK LIMITER CIRCUIT

Original Filed Nov. 19, 1964 2 Sheets-Sheet 1

INVENTOR.
Edward O. Gilbert
BY
Richard G. Stephens

ANALOG COMPUTER FEEDBACK LIMITER CIRCUIT

Original Filed Nov. 19, 1964 2 Sheets-Sheet 2

INVENTOR.
Edward O. Gilbert
BY

United States Patent Office 3,514,635
Patented May 26, 1970

3,514,635
ANALOG COMPUTER FEEDBACK LIMITER CIRCUIT
Edward O. Gilbert, Ann Arbor, Mich., assignor to Reliance Electric Company, Cleveland, Ohio, a corporation of Delaware
Continuation of application Ser. No. 412,481, Nov. 19, 1964. This application Sept. 18, 1968, Ser. No. 764,018
Int. Cl. H03k 5/08
U.S. Cl. 307—237 15 Claims

ABSTRACT OF THE DISCLOSURE

An analog computer active limiter circuit including a feedback amplifier, an adjustable voltage divider excited by the amplifier output, a current-amplifier responsive to a voltage level determined by adjustment of the voltage divider and operative to apply feedback current degeneratively to the feedback amplifier through a diode, with calibration and protective circuitry.

This invention relates to an analog computer circuit, and more particularly to an improved limiter circuit, and this application is a continuation of my prior copending application Ser. No. 412,482 filed Nov. 19, 1964. In the analog computer, automatic control and instrumentation arts, frequent use is made of limiter circuits. The usual function of a limiter circuit is to receive an input signal and to provide an output signal which is a replica of the input voltage (though perhaps inverted in sign) as long as the magnitude of the input signal does not exceed a prescribed magnitude, but to provide an output signal at the prescribed magnitude level if the input signal exceeds such a magnitude, and to continue to provide an output signal at the prescribed magnitude level so long as the input signal exceeds the prescribed magnitude, no matter how much the input signal exceeds the prescribed magnitude. Otherwise stated, the input-output characteristic of an ideal limiter is directly proportional, or of fixed slope for input signal values less than the prescribed limit value, and of zero slope for input signal values exceeding the prescribed limit value. Frequently, limiter circuits are made bi-directional, to limit at both an upper level and a lower level, so that the limiter characteristic has a predetermined slope between the upper and lower limit levels, and zero slope (ideally) outside either limit level. The voltages which establish the limit levels are derived from a variety of different applications. Sometimes such voltages are fixed, or constant, and sometimes they vary in accordance with various computer variables.

While limiter circuits of the prior art are suitable for many applications, they suffer from several disadvantages. Many limiter circuits of the prior art are incapable of providing a characteristic of truly zero slope outside their prescribed limit values, unless either a special voltage source or a high current source is provided to apply the limit value signal to the limiter circuit, or unless the operating range of the limiter circuit is drastically circumscribed. A primary object of the present invention is to provide a simple and economical improved limiter circuit which is capable of operation over a wide range of input signal values, which has an input-output characteristic of externally small slope outside the limit values, and which requires neither a special voltage nor a high current source to apply the limit value signals.

Other objects of the invention will in part be obvious and will in part appear hereinafter.

The invention accordingly comprises the features of construction, combination of elements, and arrangement of parts, which will be exemplified in the construction hereinafter set forth, and the scope of the invention will be indicated in the claims.

For a fuller understanding of the nature and objects of the invention reference should be had to the following detailed description taken in connection with the accompanying drawings, in which:

FIGS. 1*a* and 1*b* are equivalent circuit diagrams useful in understanding the operation of a theoretical perfect limiter circuit;

FIG. 1*c* is an electrical schematic diagram illustrating one common form of limiter utilized in the prior art;

Figure 1A:
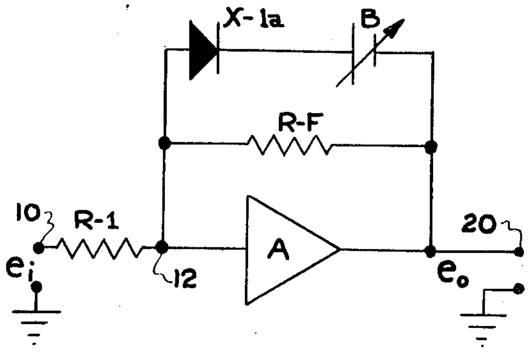

FIG. 1*a* illustrates the equivalent circuit of an ideal active limiter which limits when the amplifier output voltage reaches a selected negative voltage level. Input signal $e_1$ is applied at terminal 10 to an operational element shown as comprising operational amplifier A via input resistor R–1. Whenever the input voltage is negative, zero, or below a given positive level, the adjustable floating voltage source B reverse-biases the diode X–1*a*, and the feedback path around the amplifier through voltage source B and diode X–1*a* is ineffective, so that the amplifier output $e_o$ is related to the input $e_i$ in accordance with the well-known feedback amplifier expression:

$$e_o = -e_i \frac{R_f}{R_i}$$

where $R_f$ and $R_i$ are the impedances of the feedback and input resistors R–F and R–I, respectively. The slope of the circuit characteristic will be seen to be $R_f/R_i$. Voltage source B is assumed to have zero source impedance, and diode X–1*a* is assumed to be a perfect diode having zero forward resistance, infinite back resistance, no contact potential and a sharp-kneed (90 degree) voltage versus current characteristic.

The anode of diode X–1*a* is shown connected to the amplifier summing junction terminal 12, which lies substantially at ground potential. The voltage (referred to ground) applied to the cathode of diode X–1*a* will be seen to be the sum of the amplifier output voltage $e_o$ and the voltage $e_b$ of voltage source B. Whenever the amplifier output voltage is less negative than the positive voltage applied to the diode cathode by voltage source B, diode X–1*a* will be seen to be reverse-biased and cut off. However, when the amplifier negative output voltage $e_o$ reaches (and slightly exceeds) the magnitude of the positive voltage $e_b$, diode X–1*a* will become forward-biased. With diode X–1*a* forward biased, the amplifier summing junction 12 will be seen to be connected to the amplifier output terminal 20 through a feedback path of zero impedance, so that the overall gain of the amplifier or slope of the circuit characteristic is zero, and the output voltage $e_o$ will remain at the same negative level as an increasingly positive input signal is applied at terminal 10.

Figure 1B:
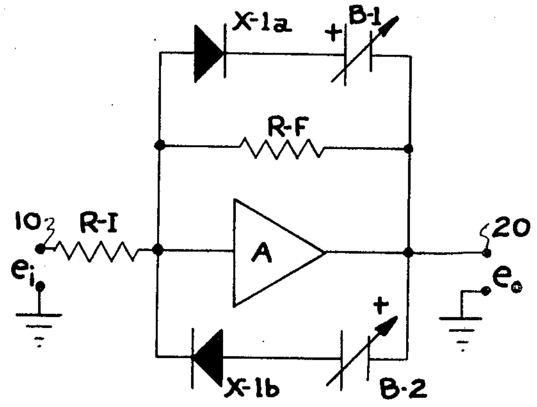

FIG. 1*b* illustrates the equivalent circuit of a theoretical, ideal bi-directional active limiter which has a slope of $R_f/R_i$ when the output voltage lies between $e_{b1}$, the voltage of floating source B–1, and $e_{b2}$, the voltage of floating source B–2, but which provides a positive output limit level at the magnitude of voltage source B–2, as well as the negative limit level determined by voltage source B–1.

Figure 1C:
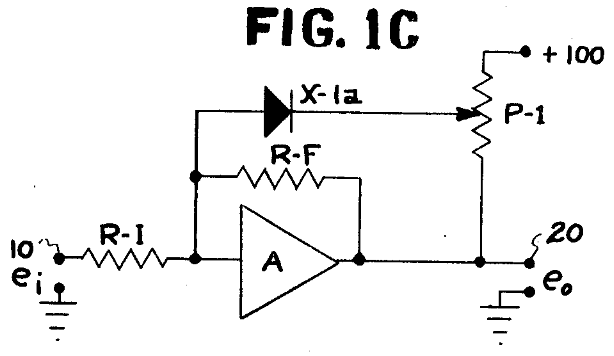

The ideal limiting characteristics of the theoretical circuits of FIGS. 1*a* and 1*b* are impossible to attain in practice, partly because perfect diodes having zero forward resistance, and no contact potential are unavailable, but mostly because adjustable zero impedance batteries or other floating voltage sources are unavailable. In the analog computer arts it is not economically feasible to provide precision low impedance voltage sources at many levels, particularly with the floating requirement of FIGS. 1*a* and 1*b*. If one wishes to provide limiting at a selected voltage level, it is apparent that one may feed an adjustable voltage divider from a constant-voltage precision voltage supply, and in practice it has been common to provide desired limit level voltages by use of precision potentiometers excited by the precision voltage supplies. Such a system is shown in FIG. 1*c* wherein potentiometer P–1 is excited by a constant voltage of +100 volts. However, unlike the theoretical adjustable floating battery B of FIG. 1*a*, the voltage source formed by the +100 volt source and potentiometer P–1 will be seen to have appreciable impedance. Unless the resistance of potentiometer P–1 is very low, the flow of current through diode X–1 into the potentiometer will be seen to vary the amplifier output varying the limit level, and on the other hand, if the resistance of potentiometer P–1 is very low, large amounts of current must be provided by the +100 volt power supply and the amplifier. As explained above in connection with FIG. 1*a*, the feedback path through diode X–1 must be zero impedance if the circuit is to have a zero slope characteristic beyond its limit level, and it will be apparent in FIG. 1*c* that the feedback circuit will not have zero or even low impedance unless the arm of potentiometer P–1 is set to the lower end of the winding to cause the circuit to limit at zero, or a very low negative output voltage. Furthermore, the slope of the limiter characteristic will be seen to depend upon the value at which limiting is selected to occur. The circuit of the present invention overcomes each of these disadvantages.

Figure 2:
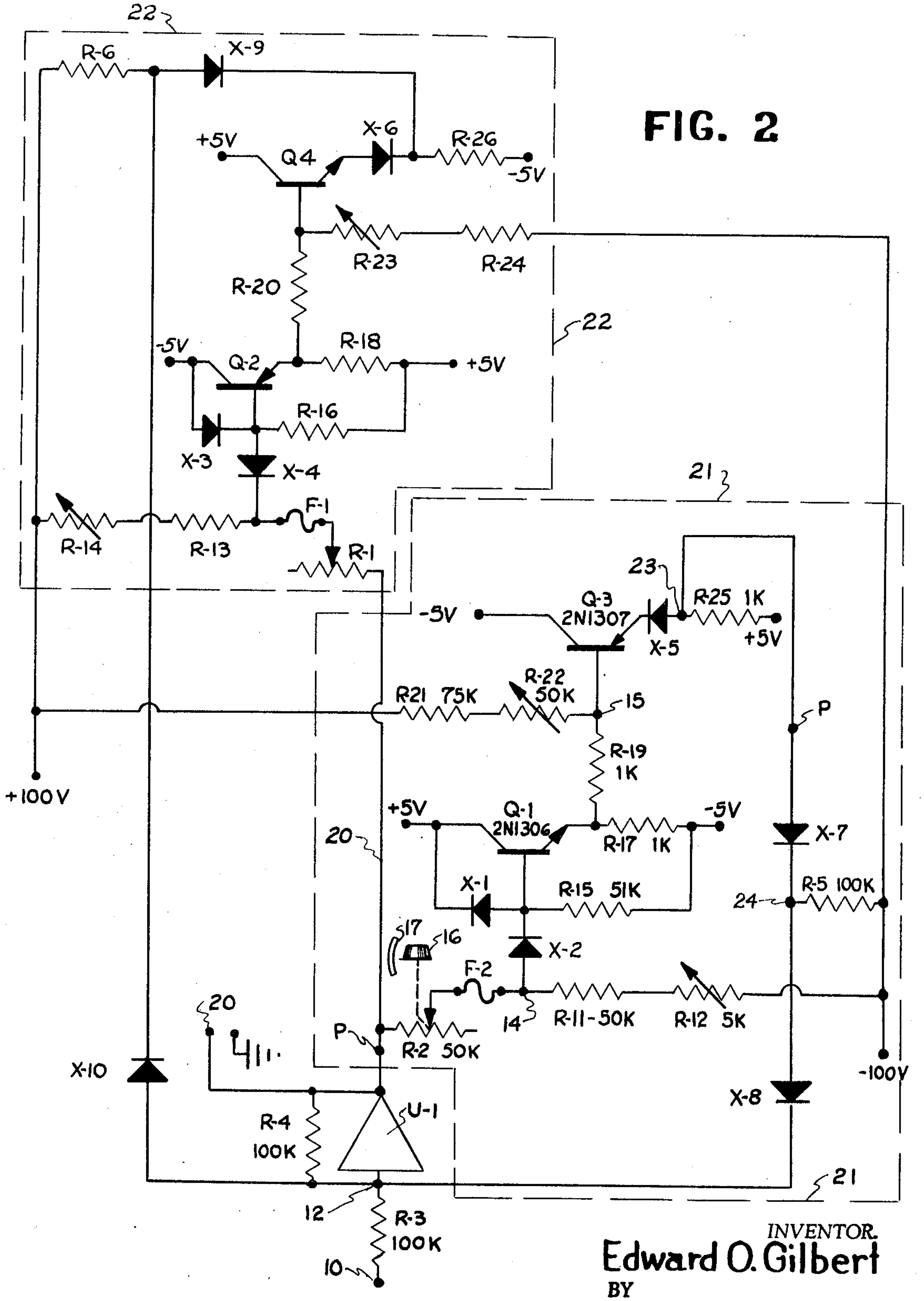
FIG. 2 is an electrical schematic diagram of one form of the present invention.

FIG. 2 illustrates an improved active limiter circuit having apparatus shown within dashed lines at 21 for limiting the positive output voltage from operational element or amplifier U–1 and apparatus shown within dashed lines at 22 for limiting the negative output voltage excursion of amplifier U–1. The two circuits shown at 21 and 22 are identical in principle and differ only by polarity reversals, and the use of opposite conductivity type transistors, so that an explanation of only one such circuit is necessary for an understanding of both. The operation of circuit 21, which limits positive output excursions, will be explained. It will be understood that in many applications limiting will be provided in only one direction.

In the improved limiter circuit of FIG. 2, the output voltage of the amplifier is applied to excite a voltage divider (R2, R11, R12). In order that the voltage divider not place a heavy load on the computer supply or on the amplifier, it is desirable that the sum of resistances R2, R11 and R12 be high. A voltage from a tap (terminal 14) of the voltage divider controls the conduction of a diode (X–2), which in turn controls a first emitter follower (Q1). At amplifier output voltages below the selected limit level (which level is determined by adjustment of potentiometer R2), diode X–2 is cut off. When the amplifier output voltage increases to a point where diode X–2 becomes forward biased and starts to conduct, it will be seen that the current passing through diode X–2 begins to load the voltage divider. As the input signal is further increased and the amplifier output voltage tends to increase, increasing current is drawn from the voltage divider and increasing current passes through the diode. It will be seen to be desirable that minimum current be drawn through the diode, in order that the voltage at terminal 14 change as little as possible. Because of the current gain in the emitter follower, a very small increase in diode current, and hence minimum loading of the voltage divider, causes a substantial increase in output current from the first emitter follower. A second emitter follower (Q3) receives input currents from fixed bias sources and from the first emitter follower. The two emitter followers are shown being of opposite conductivity types, and an increase (from zero) of output current from the first emitter follower causes a decrease in current in the second emitter follower circuit, driving the latter toward cutoff. The second emitter follower is connected in a current steering circuit. Prior to limiting, all of the current through the emitter follower load resistor R25 is drawn by the transistor Q3, but as transistor Q3 is cut off, most of the current is steered to the amplifier summing junction. Prior to limiting, the current through the emitter load resistor R25 of the second emitter follower holds the emitter output terminal 23 at a negative voltage. The emitter output terminal 23 is connected to the amplifier summing junction 12 via diodes (X–7, X–8) and hence no current flows from terminal 23 to the summing junction. As limiting takes place the decrease in current through transistor Q3 causes the terminal 23 voltage to rise positively, so that current begins to flow into the summing junction. Due to the considerable current gain in the two cascaded emitter followers, an extremely small increase in current through the voltage divider causes a very large increase in input current to the summing junction as limiting occurs. Once limiting occurs, increases in input signal current to the operational amplifier are cancelled out by increases in the current applied to the summing junction. No appreciable increase occurs in the current drawn from the voltage divider, and hence no appreciable change occurs in the amplifier output voltage.

The output voltage on line 20 of amplifier U–1 will be seen to be connected through a voltage divider comprising potentiometer R2, fuse F2, resistor R11, and variable resistor R12 to the −100 volt supply of the computer. The anode of diode X–2 is connected as shown at terminal 14 to the wiper of potentiometer R2. If the output voltage of amplifier U–1 is substantially negative, it will be seen that a negative voltage will be applied to the anode of diode X–2. The cathode of diode X–2 is shown returned to a −5 volt supply through resistor R–15, and hence diode X–2 will remain back-biased until whenever terminal 14 becomes slightly more positive than −5 volts. As will be shown below, diode X–8, which is connected to the summing junction 12 of the operational amplifier, will be cut off whenever the amplifier output is negative, and will remain cutoff at all positive levels below the level at which limiting is selected to occur. As the output voltage of amplifier U–1 becomes sufficiently positive, diode X–2 will conduct. The positive voltage level at which limiting is desired is selected by adjustment of potentiometer R2. An adjustment knob 16 or the like and a scale 17 may be provided to facilitate adjustment of R2 to desired settings. By adjustment of "Calibrate" potentiometer R12, it will be seen that the voltage at terminal 24 may be adjusted to be zero volts when the scale on potentiometer R2 reads full scale and the amplifier output is at full-scale. Thus R12 provides full scale calibration of control R2. When the amplifier output is far negative, the back biased diode X–2 protects Q–1 from base to emitter breakdown.

Whenever the amplifier output voltage and the adjustment of potentiometer result in a voltage at terminal 14 more negative than −5 volts, diode X–2 will be seen to be cut off, and with diode X–2 cut off, transistor Q1 will be cut off. As the R2 wiper arm (terminal 14) voltage reaches −5 volts, diode X–2 begins to conduct, and transistor Q1 will be turned on. Transistor Q1, an NPN transistor, is connected in an emitter follower circuit having a voltage gain approximating unity and substantial current gain, and thus as the amplifier output voltage terminal 20 swings further positive, the emitter voltage of transistor Q1 also swings further positive. Due to the substantial current gain of the Q1 emitter follower, very small increases in input current from diode X–2, and hence minimum added loading of the voltage divider, provide substantial increases in the output current from the Q1 emitter follower. Because very little current need be drawn through diode X–2, the voltage at terminal 14 does not change substantially. Diode X–1 is connected between base and collector of transistor Q1, and the collector is connected to a +5 volt supply potential. If the voltage at terminal 14 goes very positive, conduction of diode X–1 prevents the Q1 base-collector voltage from exceeding +5 volts, thereby protecting transistor Q1. The output current through the emitter of transistor Q1 is applied via summing resistor R19 to the base of further emitter follower transistor Q3.

Transistor Q3 is shown as comprising a PNP type and prior to the occurrence of limiting it is normally conducting, a +5 volt supply being connected to its emitter via resistor R25 (and diode X–5, which is optional) and a relatively negative voltage being applied to the Q3 base from terminal 15 of a voltage divider shown as comprising resistances R17, R19, R22 and R21. As shown, resistor R21 and variable resistance R22 apply a current from the +100 volts computer supply to be summed with the currents applied to the Q3 base via resistor R19 from transistor Q1 and from the −5 volts supply via resistor R17. The resistor R22 provides zero calibration of control R2. Thus R2 is set to zero value, the amplifier output is set at zero volts, and R22 is adjusted to provide zero volts at terminal 24. With R22 and R12 calbriated as indicated there will be a one-to-one correspondence between the dial setting at 17 and the desired limit voltage.

Normally forward-biased diodes X–5 and X–7 are shown employed to protect transistor Q–3 from damage which otherwise might result if a large voltage such as +100 volts or −100 volts is erroneously or accidentally connected to the amplifier summing junction. A large negative voltage will be seen to reverse-bias diode X–5, and a large positive voltage will be seen to reverse-bias diode X–7, with the result in either case that the large voltage will not be applied to damage transistor Q–3.

As an increasingly positive amplifier output voltage drives terminal 14, the Q–1 emitter and the Q3 base each increasingly positive, transistor Q3, a PNP type, is driven toward cut off, thereby causing terminal 23, the Q3 emitter potential and terminal 24 to be driven in a positive direction. Thus current now will flow through diode X–8 to the amplifier summing junction and limiting will occur. Because of the substantial current gain in emitter followers Q1 and Q3, it will be appreciated that extremely small increases in current through diode X–2 are capable of causing relatively great increases in current through diode X–8 to the summing junction, and hence the slope of the limiter characteristic is extremely flat and substantially zero after limiting takes place. It will be seen that the voltage divider (R2, R11, R12) need draw only a small amount of current from the amplifier output, and hence the limiter circuit does not appreciably load the amplifier.

It will be seen that by adjustment of potentiometer R2, the level at which diode X–2 conducts, and hence the level at which limiting takes place, may be adjusted to occur at any desired value from zero to +100 volts, over the entire computer range in the positive direction. As mentioned above, negative limiter circuit 22 operates in identical fashion to limit negative output voltages at any selected negative level between zero and −100 volts.

As well as being useful with ordinary summing amplifiers, it will be apparent at this point that the limiter circuits 21 and 22 may be used with a variety of other feedback amplifier circuits, such as electronic integrators, such as would be formed by replacing feedback resistor R4 in FIG. 2 with a capacitor.

The present invention has found particular use in general purpose analog computers which are programmed by means of a patchboard or the like. A number of limiter circuits of the types shown at 21 and 22 have been provided in such computers for selective connection to various operational amplifiers. Where the limiter circuits are physically located at substantial distances from the amplifier, diodes X–7, X–8 and resistor R5 have been located adjacent to the patchboard in order to keep high impedance lines from the summing junctions short and reduce noise pick-up. The terminals marked P in FIG. 2 represent the terminals of limiter circuit 21 which are selectively patched or switched to a selected amplifier. Fuse F–2 connected in series with potentiometer R–2 prevents the damage which might occur to the potentiometer if the upper terminal P of limiter circuit 21 were accidentally patched to the +100 volts supply rather than to the amplifier output line. As mentioned above, diodes X–5 and X–7 and resistor R5 are provided to protect Q3 against the damage which otherwise might occur from accidental or erroneous connection of +100 volts or −100 volts to the cathode of X–8. If such protection is not required, F–2, X–5, X–7, and R5 maybe omitted, the arm of R–2 connected to terminal 14 and terminal 24 connected to the emitter of Q3. Diode X–2 protects Q1 against base to emitter breakdown during the presence of a highly negative amplifier output, which will be seen to reverse-bias diode X–2. Diode X–1 similarly protects Q1 against base to collector breakdown if +100 volts or some other high positive voltage is connected in error to terminal 20 of potentiometer R–2, it being apparent that any such large positive voltage will be blocked by diode X–1. If the transistor breakdown voltage ratings are large enough, or if such high voltages are not present, it is possible to omit diodes X–1 and X–2.

The use of complementary transistors is not necessary for circuit operation. The use of PNP and NPN types as shown in FIG. 2 does have the advantage of junction potential cancellation. This minimizes the effect of temperature variation on the junction potentials.

The diode X–8 should be an exceptionally fast diode with very low back capacity to minimize dynamic errors.

Figure 3:
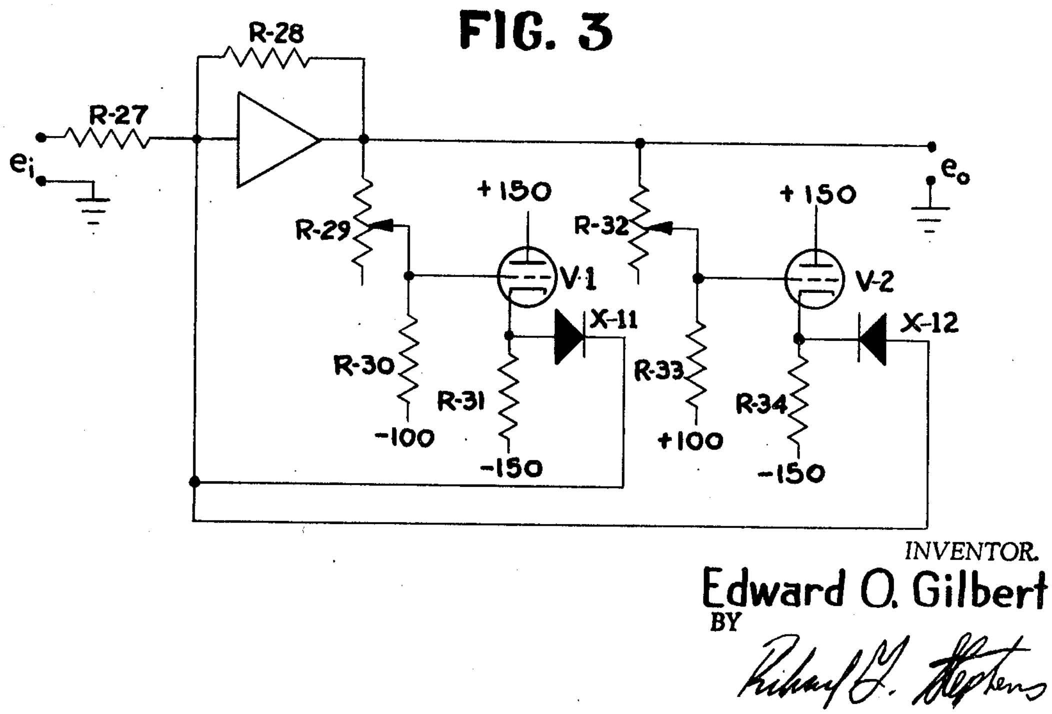
FIG. 3 is an electrical schematic diagram of another form of the present invention.

The use of two cascaded transistors to provide the active element of the feedback path is not a requirement of the invention. One transistor of sufficient gain will perform the same function. The use of two transistors does simplify the zero calibration performed by adjustment of variable resistance R–22, however. In practice of alternative forms of the invention, the use of vacuum tube or other active element circuitry is possible. FIG. 3 shows a simplified cathode-follower vacuum tube limiter without calibration circuitry or the transistor protective circuitry of FIG. 2. Potentiometer R–29 adjusts the plus limit, potentiometer R–32 adjusts the negative limit, and VI and V2 are the cathode follower current amplifiers. Potentiometer R–29 will be seen to provide the same overall function as potentiometer R–2 of FIG. 2, the V–1 cathode follower current amplifier the same function as that of cascaded emitter follower Q–1 and Q–3 circuits, and diode X–11 the same function as that of diode X–8 of FIG. 2.

It will thus be seen that the objects set forth above, among those made apparent from the preceding description, are efficiently attained, and since certain changes may be made in the above construction without departing from the scope of the invention, it is intended that all matter contained or shown in the accompanying drawings shall be interpreted as illustrative and not in a limiting sense.

Having described my invention, what I claim as new and desire to secure by Letters Patent is:

1. A circuit having an input signal applied to an input terminal thereof for producing an output signal at an output terminal thereof, in which said output signal increases in magnitude as the input signal increases in magnitude until said output signal reaches a predetermined limiting value, comprising: a direct coupled multi-stage operational amplifier connected between said input and output terminals and including an input resistor connected between said input terminal and an input of said amplifier, a feedback resistor directly connected between said output terminal and said amplifier input to provide a non-reactive resistance feedback path, and a feedback limiter circuit including in a series circuit resistance means, a second amplifier and a unidirectionally-conducting circuit connected between said output terminal and said amplifier input, source means connected to said limiter circuit for setting the level of said predetermined limiting value, thereby to turn off said unidirectionally-conducting circuit when said output voltage is below said predetermined limiting value and to turn on said unidirectionally-conducting circuit when said output voltage reaches said limiting value, whereby with said unidirectionally-conducting circuit conducting the impedance of said feedback circuit reduces in value to zero as a limit to provide a gain for said direct-coupled amplifier which approaches zero as a limit to prevent said output voltage from increasing.

2. A limiter circuit for providing an output voltage at an output terminal which varies in accordance with a prescribed function of an input voltage applied to an input terminal and for preventing said output voltage from increasing beyond a predetermined limiting value, comprising: a direct-coupled amplifier connected between said input and output terminals, an input impedance connected between said input terminal and an input of said direct-coupled amplifier, a feedback impedance connected between said output terminal and said amplifier input, and a feedback limiter circuit including in series circuit relation voltage divider means, a second amplifier, and unidirectionally-conducting means connected between said output terminal and said amplifier input, said voltage divider means comprising two voltage divider resistors connected in a series circuit having one end of said series circuit connected to said output terminal and having a common point of said resistors connected to an input of said second amplifier, whereby when said output voltage is below said limiting value said unidirectionally-conducting means does not conduct and said feedback impedance comprises the only feedback element for said direct-coupled amplifier, and at said limiting value said unidirectionally-conducting means is caused to conduct, reducing to zero as a limit the effective feedback impedance of said direct-coupled amplifier.

3. A circuit having an input signal applied to an input terminal thereof for producing an output signal at an output terminal thereof, in which as the input signal increases in magnitude the output signal correspondingly increases in magnitude until a predetermined limiting value is reached, comprising: a direct-coupled operational amplifier connected between said input and output terminals and including an input resistor connected between said input terminal and an input of said direct-coupled amplifier, a feedback resistor connected between said output terminal and said direct-coupled amplifier input, a feedback limiter circuit including in a series circuit a voltage divider, a second amplifier and a unidirectionally-conducting circuit means connected between said output terminal and said direct-coupled amplifier input, said voltage divider having one end connected to said output terminal and a center tap connected to an input of said second amplifier, and variable source means connected to the other end of said voltage divider for setting the level of said predetermined limiting value, thereby to prevent current flow between said second amplifier and said direct-coupled amplifier input through said unidirectionally-conducting circuit means when said output voltage is below said predetermined limiting value, and to provide current flow between said second amplifier and said direct-coupled amplifier input through said unidirectionally-conducting circuit means when said output voltage reaches said limiting value, whereby with said current flow provided through said unidirectionally-conducting circuit means the impedance of said feedback circuit reduces in value to zero as a limit to provide a gain for said direct-coupled amplifier which approaches zero as a limit to prevent said output voltage from increasing.

4. A limiter circuit according to claim 2 in which said feedback impedance comprises a capacitor.

5. A limiter circuit according to claim 2 in which said two voltage divider resistors include two sections of the resistance element of a potentiometer, and in which said common point of said resistors comprises an adjustable tap of said potentiometer.

6. A limiter circuit according to claim 2 in which said second amplifier means includes means for adjusting the output voltage of said second amplifier means to provide a reference value current through said unidirectionally-conducting means when the output voltage at said output terminal is at a reference potential level.

7. A limiter circuit according to claim 2 in which said second amplifier comprises an emitter-follower stage.

8. A limiter circuit according to claim 2 in which said second amplifier is provided with a current gain greater than unity.

9. A limiter circuit according to claim 7 in which said emitter-follower stage includes a diode connected to prevent application of a voltage of a selected polarity to said emitter-follower stage.

10. A limiter circuit according to claim 9 in which said diode is connected between said common point and said input of said second amplifier.

11. A limiter circuit according to claim 9 in which said diode is connected in series with said unidirectionally-conducting means between an output of said second amplifier and said input of said direct coupled amplifier.

12. A limiter circuit for preventing an output voltage at an output terminal from increasing beyond a predetermined limiting value as the input voltage applied to an input terminal increases in value, comprising, in combination: a direct-coupled amplifier connected between said input and output terminals and including an input impedance connected between said input terminal and an input of said direct-coupled amplifier; a feedback impedance connected between said output terminal and said input of said direct-coupled amplifier; and a feedback limiter circuit including voltage divider means connected between said output terminal and a point of reference potential and having a tap, second amplifier means having an input circuit connected to said tap and an output circuit, and a unidirectionally-conducting circuit connected between said output circuit of said second amplifier and said input of said direct-coupled amplifier, whereby when said output voltage is below said limiting value said unidirectionally-conducting circuit is non-conducting and said feedback impedance comprises the only feedback element for said direct-coupled amplifier and whereby at said limiting value of said output voltage said unidirectionally-conducting circuit is rendered conducting, thereby reducing to zero as a limit the effective feedback impedance of said direct-coupled amplifier.

13. A limiting circuit for controlling the output limits of an operational element comprising: feedback circuit means connected between the input and output of the operational element and including a pair of feedback circuits each including active element means having applied thereto reference signals for establishing thereby the positive and negative output limits for the operational element, the operative condition of each of said active element means being responsive respectively to the positive and negative output limits of said operational element to prohibit the operational element from exceeding its positive and negative output limits, and unidirectionally conducting means in series connection with said active element means to isolate said limiting circuit from the operational element and operating within the input limits thereof; and reference signal means for applying said reference signals to said active element means.

14. A limiter circuit for providing an output voltage at an output terminal varies in accordance with the value of an input current applied to an input terminal over a range of output voltage values of one polarity relative to a first reference level and which is prevented from exceeding a predetermined limit value defining the upper limit of said range, comprising, in combination: a direct-coupled amplifier having an input circuit connected to said input terminal and an output circuit connected to said output terminal; input impedance means for applying said input current to said input terminal; feedback impedance means connected between said output terminal and said input terminal; voltage divider means connected between said output terminal and a further terminal established at an opposite polarity from said one polarity, said voltage divider means having a tap terminal at which the voltage tends to change polarity relative to a reference level from said opposite polarity to said one polarity as said output voltage reaches and tends to exceed said predetermined limit value; and further amplifying means and unidirectional current-conducting means connected between said tap terminal and said input terminal, to apply current to said input terminal whenever said output voltage tends to exceed said predetermined limit value and the voltage at said tap terminal tends to change to said one polarity, and not to apply current to said input terminal whenever said output voltage lies within said range of output voltage values and said voltage at said tap terminal has said opposite polarity.

15. A limiter circuit for providing an output voltage at an output terminal which varies in accordance with a prescribed function of an input current applied to an input terminal over a range of output voltage values, and which is prevented from becoming less than a lower limit value or greater than an upper limit value, said upper and lower limit values defining said range, comprising, in combination: a direct-coupled amplifier having an input circuit connected to said input terminal and an output circuit connected to said output terminal; input impedance means for applying said input current to said input terminal; feedback impedance means connected between said output terminal and said input terminal; a first voltage source for providing a second signal commensurate with a desired value of said lower limit; first summing means including resistance means connected to combine said output voltage and said second signal to provide a third voltage; second amplifier means connected to amplify said third voltage; first diode means connected between the output circuit of said second amplifier means and said input terminal to apply a current to said input terminal only when said output voltage reaches and tends to become less than said lower limit value; a second voltage source for providing a fourth signal commensurate with a desired value of said upper limit; second summing means including resistance means connected to combine said output voltage and said fourth signal to provide a fifth voltage; third amplifier means connected to amplify said fifth voltage; and second diode means connected between the output circuit of said third amplifier means and said input terminal to apply a current to said input terminal only when said output voltage reaches and tends to become greater than said upper limit value.

References Cited

UNITED STATES PATENTS

| | | | |
|---|---|---|---|
| 3,052,853 | 9/1962 | Smith | 330—29 X |
| 3,202,922 | 8/1965 | De Schanphelaere | 330—10 X |
| 3,222,607 | 12/1965 | Patmore | 330—10 X |
| 3,231,728 | 1/1966 | Kusto | 235—183 |
| 3,104,358 | 9/1963 | Heacock | 328—175 |
| 3,153,152 | 10/1964 | Hoffman | 307—237 X |
| 3,166,720 | 1/1965 | Rosen et al. | 307—229 X |

OTHER REFERENCES

Pub. I. Electronic Analog Computers by Korn and Korn, 1956 (McGram-Hill) pp. 83, 105 and 142 relied upon.

JOHN S. HEYMAN, Primary Examiner

S. D. MILLER, Assistant Examiner

U.S. Cl. X.R.

307—229, 230; 328—127, 142, 171